United States Patent
Lissack et al.

(10) Patent No.: US 10,002,013 B2
(45) Date of Patent: *Jun. 19, 2018

(54) OBTAINING VIRTUAL MACHINE IMAGES FROM VIRTUALIZATION ENVIRONMENTS

(71) Applicant: Amazon Technologies, Inc., Reno, NV (US)

(72) Inventors: Avichai M. Lissack, McLean, VA (US); Bashuman Deb, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/399,585

(22) Filed: Jan. 5, 2017

(65) Prior Publication Data

US 2017/0116010 A1   Apr. 27, 2017

Related U.S. Application Data

(63) Continuation of application No. 14/631,682, filed on Feb. 25, 2015, now Pat. No. 9,558,024, which is a
(Continued)

(51) Int. Cl.
*G06F 9/455* (2018.01)
*G06F 15/177* (2006.01)
(Continued)

(52) U.S. Cl.
CPC ............ *G06F 9/45533* (2013.01); *G06F 8/76* (2013.01)

(58) Field of Classification Search
None
See application file for complete search history.

(56) References Cited

U.S. PATENT DOCUMENTS 7,356,679 B1   4/2008 Le et al.
8,464,247 B2   6/2013 Laska et al.
(Continued)

OTHER PUBLICATIONS

"Amazon EC2 VM Import Connector for VMware vCenter," retrieved on Oct. 25, 2011, from http://aws.amazon.com/developertools/2759763385083070, 2 pages.
(Continued)

*Primary Examiner* — Bing Zhao
(74) *Attorney, Agent, or Firm* — Seed IP Law Group LLP

(57) ABSTRACT

Techniques are described for facilitating sharing and reuse of executable software images between multiple execution environments. In at least some situations, the executable software images are virtual machine images (e.g., images that are bootable or otherwise loadable by a virtual machine in a particular virtualization environment, and that each include operating system software and/or software for one or more application programs, optionally along with one or more hard disks or other representations of stored data). The described techniques may include use of an image conversion tool that is configured to support interactions with multiple distinct types of source execution environments to extract executable software images from those environments, and to modify extracted software images for execution in one or more distinct types of destination execution environments, optionally as directed by one or more users via a GUI provided by the image conversion tool.

19 Claims, 7 Drawing Sheets

Related U.S. Application Data continuation of application No. 13/313,701, filed on Dec. 7, 2011, now Pat. No. 8,990,804.

(51) Int. Cl.
*G06F 9/00* (2006.01)
*G06F 9/44* (2018.01)

(56) References Cited

U.S. PATENT DOCUMENTS

2010/0058328 A1  3/2010  DeHaan
2011/0022812 A1*  1/2011  van der Linden .... G06F 9/5077
                                                          711/163

OTHER PUBLICATIONS

"Citrix XenConvert Guide," Apr. 6, 2010, retrieved Oct. 25, 2011, from http://support.citrix.com/servlet/KbServlet/download/20644-102-332133/XenConvertGuide.pdf, 44 pages.

"More on P2V: Citrix XenConvert vs. VMware vCenter Converter," May 13, 2009, retrieved on Oct. 25, 2011, from http://blog.fandotech.com/more-on-p2v-citrix-xenconvert-vs-vmware-vcenter-converted, 3 pages.

"VM Import," retrieved on Oct. 25, 2011, from http://aws.amazon.com/ec2/vmimport/, 2 pages.

"VMware," retrieved on Oct. 25, 2011, from http://en.wikipedia.org/wiki/VMware_Converter, 6 pages.

"VMware vCenter Converter," retrieved on Oct. 25, 2011, from http://www.vmware.com/products/converter/faqs.html, 2 pages.

\* cited by examiner

OBTAINING VIRTUAL MACHINE IMAGES FROM VIRTUALIZATION ENVIRONMENTS

BACKGROUND

The advent of virtualization technologies for commodity hardware has provided benefits for many customers with diverse needs, allowing various computing resources to be efficiently and securely shared between multiple customers. For example, virtualization environments such as those provided by VMWare, XEN, Hyper-V and User-Mode Linux may allow a single physical computing machine to be shared among multiple users by providing each user with one or more virtual machines hosted by the single physical computing machine. Each such virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems. However, each virtualization environment typically operates using data formats and interfaces specific to that virtualization environment, inhibiting interoperability between virtualization environments.

DETAILED DESCRIPTION

Figure 1:
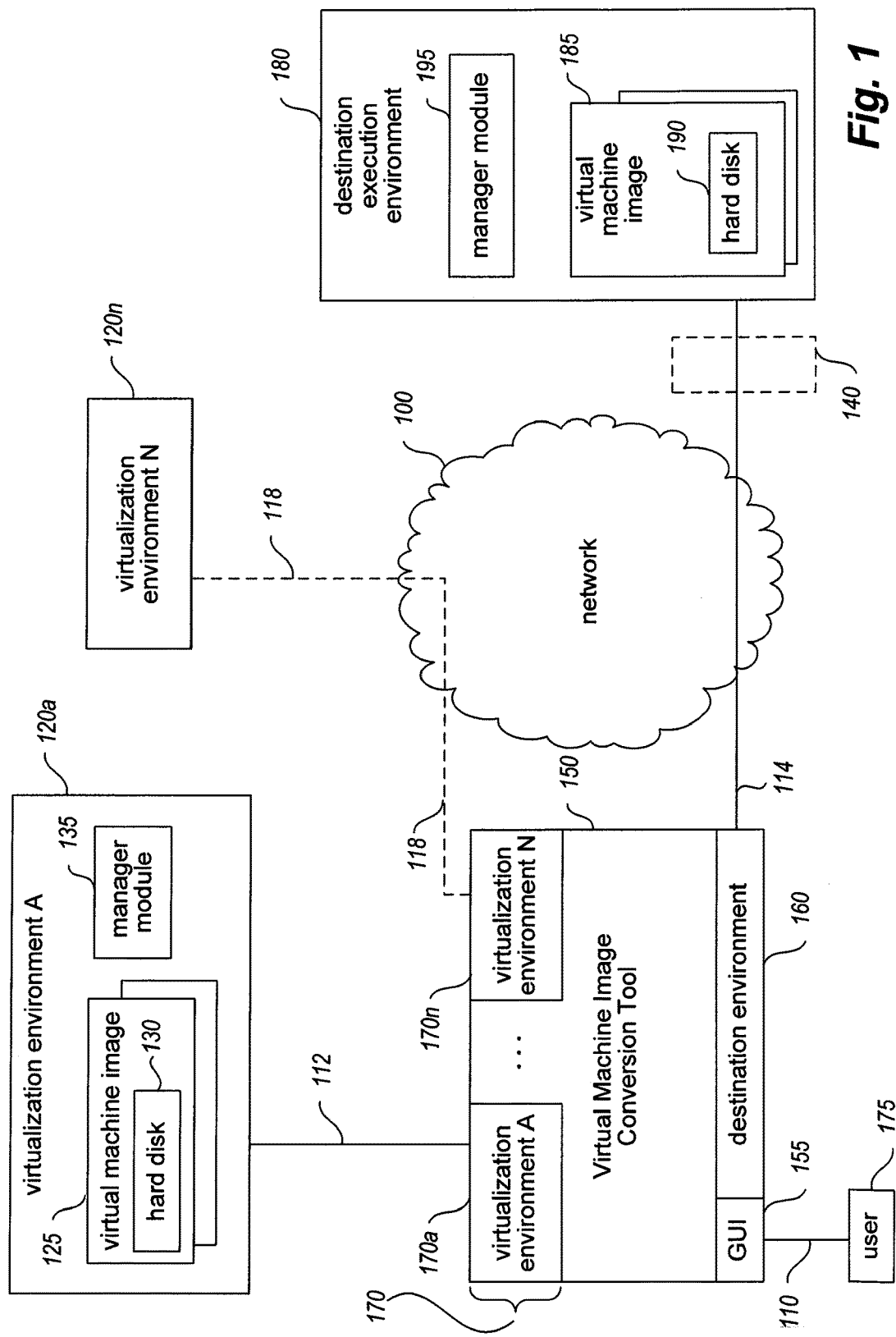
FIG. 1 is a network diagram illustrating an example environment in which an image conversion tool may be used.

Techniques are described for facilitating sharing and reuse of executable software images between multiple execution environments. The described techniques include use of an image conversion tool in at least some embodiments, such as an image conversion tool that is configured to support interactions with multiple distinct types of source execution environments to extract executable software images from those source execution environments, and to modify extracted software images for execution in one or more distinct types of destination execution environments. In at least some such embodiments, the image conversion tool may provide a GUI ("graphical user interface") via which one or more users of the image conversion tool specify and configure particular types of operations to be performed. In at least some embodiments, the executable software images are virtual machine images (e.g., images that are bootable or otherwise loadable by a virtual machine in a particular source virtualization environment, and that each include operating system software and/or software for one or more application programs, optionally along with one or more hard disks or other representations of stored data). Additional details related to sharing and reuse of executable software images are included below, and the described techniques are automatically performed in at least some embodiments by one or more image conversion tools.

The described techniques may be provided in a variety of manners in various environments and situations. For example, some software execution environments may provide one or more executing pieces of software that provide defined APIs ("application programming interfaces") or other defined interfaces, and the image conversion tool may programmatically invoke or otherwise access such provided interfaces (e.g., over one or more intervening connections or networks), including to initiate the providing by the software execution environment of data corresponding to a particular software image of interest. In addition, some software execution environments may store data corresponding to some or all software images in a manner that is remotely accessible, and with the data in a format that may be manipulated by the image conversion tool, and if so the image conversion tool may programmatically access and retrieve such data for a software image of interest. Other types of interactions may be performed between the image conversion tool and a software execution environment in other embodiments in order to extract data corresponding to a software image of interest (e.g., by executing software of the image conversion tool within a virtual machine or other execution environment of the software execution environment). In addition, in some embodiments and situations, the image conversion tool may receive data corresponding to a software image of interest in other manners, such as if a user uploads that data directly to the image conversion tool (e.g., after the user obtains the data from a particular execution environment).

In addition, a particular image conversion tool may be designed and/or configured to support particular source execution environments in various manners, such as by storing configuration information that is specific to each source execution environment. In at least some embodiments, the image conversion tool may further be designed with an architecture that enables support for additional execution environments to be later added to the image conversion tool, such as by providing a standardized group of types of interactions that may be performed with execution environments, and then storing information specific to each execution environment to indicate which types of interactions are available and the details of how they are performed in a manner specific to that execution environment. In some such embodiments, the configuration information specific to a particular software execution environment may be provided in whole or in part in a module specific to that software execution environment, such as in a plug-in module that is added to the image conversion tool (or accessed by the image conversion tool) after the image conversion tool creation is completed.

After the data corresponding to a software image is obtained by the image conversion tool, the image conversion tool may modify or otherwise manipulate the data in various manners in order to prepare it to be executed in one or more distinct destination execution environments. The image conversion tool may further provide the data for the software image for use in a destination execution environment in various manners, including by transmitting the data over one or more connections or networks to the destination execution environment. Non-exclusive examples of types of data manipulations of a software image may include changing a data format in which the data is stored, adding additional data (e.g., to correspond to one or more software libraries or drivers or other programs that are available for execution or other use while the software image is executing), changing references within the software image to how and where data for use by the software image is stored, combining or separating the data into different sizes or configurations supported by the destination execution environment, compressing the data, encrypting the data, etc.

The use of the described techniques provides a variety of benefits in various embodiments. For example, by enabling a user to direct an image conversion tool to interact with and extract executable virtual machine images from any of multiple distinct types of source virtualization environments, the user may consolidate use of multiple distinct types of virtual machine images in a single destination virtualization environment, without losing time and effort involved in creating the various virtual machine images. Furthermore, in at least some such embodiments and situations, some or all of the various source virtual machine images may be modified in various manners that are supported by the destination virtualization environment, including to optionally standardize aspects of the various source virtual machine images and/or to add new capabilities available in the destination virtualization environment that were not previously available or used in source virtualization environments from which the source virtual machine images are extracted.

Various types of virtualization environments and other software image execution environments may be supported in various embodiments. A non-exclusive list of examples of such software image execution environments include those provided by or with VMWare Server, VMWare Workstation, XenServer, Hyper-V Server, VirtualBox, KVM ("Kernel-based Virtual Machine"), User-Mode Linux, OpenVZ ("Open Virtualization"), etc. In addition, virtual machine images and other software images executable by or otherwise supported by such software image execution environments may store different types of programs and/or non-executable data in various manners.

For illustrative purposes, some embodiments are described below in which specific types of operations are performed and specific types of data used, including to interact with virtualization environments to extract, modify and execute virtual machine images. These examples are provided for illustrative purposes and are simplified for the sake of brevity, and the inventive techniques may be used in a wide variety of other situations, some of which are discussed below.

FIG. 1 is a network diagram illustrating an example of various systems that may interact in order to enable an image conversion tool 150 to perform various of the described techniques. In particular, the image conversion tool may interact with various source virtualization environments in order to obtain data corresponding to source virtual machine images that execute in those source virtualization environments, and may modify the obtained data for a source virtual machine image to enable the virtual machine image to execute in a distinct type of destination virtualization environment. In the illustrated example, at least some of the operations of the image conversion tool 150 are directed by an associated user 175 of the image conversion tool, although in other embodiments at least some of the operations of the image conversion tool may instead be performed in an automated manner.

In particular, in the illustrated embodiment, the user 175 has access to one or more virtual machine images 125 that execute as part of a source virtualization environment A 120a. For example, in some such situations, the user 175 may execute the virtualization environment A 120a on one or more computing systems (not shown) that are under control of the user, such as may be executing at a facility or location of the user, or the user 175 may instead interact with the virtualization environment A over one or more intervening networks (not shown).

In the illustrated example, the user 175 desires to convert at least one of the virtual machine images 125 from source virtualization environment A to enable the converted virtual machine image to be executed in a distinct destination execution environment 180, with the destination execution environment 180 being of a different type of virtualization environment than that of source virtualization environment A 120a in this example. Accordingly, in this example, the user obtains access to (e.g., downloads) a copy of the virtual machine image conversion tool 150 for use in the virtual machine image conversion process. The user 175 may, for example, execute the image conversion tool 150 on one or more computing systems (not shown) that are local to the virtualization environment A 120a, such as at the same facility or other location (e.g., on a common local area network), including in some embodiments and situations to optionally execute the conversion tool 150 on one or more computing systems that are part of the virtualization environment A 120a. In other embodiments, the conversion tool 150 may execute remotely from the virtualization environment A 120a, such as over one or more public networks.

In the illustrated embodiment, the image conversion tool 150 supports interactions with multiple distinct types of source virtualization environments from which virtual machine images or other software images may be extracted, so that the extracted software images may be manipulated to enable their execution in a distinct destination execution environment. For example, the image conversion tool 150 may be designed and/or configured to support a fixed number and type of source virtualization environments, or may instead have an architecture that enables configuration information specific to a particular source virtualization environment to be provided to the image conversion tool after its initial creation. In the illustrated embodiment, the image conversion tool 150 may support multiple plug-in modules 170 that each provides an interface to one of multiple distinct types of source virtualization environments.

Accordingly, in the illustrated example, the user 175 performs one or more interactions 110 with GUI 155 of the image conversion tool 150. Such interactions may include, for example, identifying a specific source virtualization environment with which the image conversion tool 150 will interact, specifying a particular source image to be extracted from a source virtualization environment, and providing configuration information to control the manipulation and provision of the extracted image for a particular destination execution environment.

In this example, the interactions 110 of the user 175 with the GUI 155 include the user identifying source virtualization environment A 120a, and accordingly the image conversion tool 150 selects a module 170a specific to that source virtualization environment. The image conversion tool 150 then uses the selected module 170a to perform one or more interactions 112 with the virtualization environment A 120a, such as in some embodiments to interact with a manager module 135 of the source virtualization environment to obtain data for at least one virtual machine image 125 that is executing in the source virtualization environment or stored in or accessible to the source virtualization environment. For example, the manager module 135 may provide one or more APIs (not shown) that enable programmatic interactions between the module 170*a* and the manager module 135, while in other embodiments the interactions 112 may include the image conversion tool 150 interacting directly with stored data corresponding to a particular virtual machine image 125 of interest. For example, each virtual machine image 125 may include one or more hard disks 130 that store data representing the virtual machine image, and such hard disk data may be persistently stored on non-volatile storage accessible to the virtualization environment A (e.g., on one or more local physical hard disks of one or more computing systems executing the virtualization environment A) while the virtual machine image is not executing. Thus, the interactions 112 may instead in some embodiments and situations interact directly with one or more non-volatile storage devices (or a storage manager interface to such devices) in order to obtain access to stored data for such hard disks.

The data corresponding to a particular virtual machine image 125 that is extracted from the source virtualization environment A 120*a* may have various forms in various embodiments, such as one or more streams of raw data, one or more streams of compressed data, one or more downloadable pieces of data (e.g., files), etc. In some source virtualization environments, the hard disk data may be stored in a standardized format for that source virtualization environment, which the corresponding interface module 170 may access and download. Such data formats may include, for example, VHD ("Virtual Hard Disk"), VMDK ("Virtual Machine Disk"), VDI ("Virtual Disk Image"), OVF ("Open Virtualization Format"), etc.

After the data corresponding to a particular virtual machine image is extracted via the interactions 112, the image conversion tool 150 performs one or more modifications or other manipulations of the extracted data in order to prepare it for a distinct virtualization environment available in the destination execution environment 180. For example, the data manipulations of the data for the virtual machine image may include changing a data format in which the data is stored, adding additional data (e.g., to correspond to one or more software libraries or drivers or other programs that are available for execution or other use while the virtual machine image is executing), changing references within the virtual machine image to how and where data for use by the virtual machine image is stored, etc. While not illustrated in FIG. 1, the image conversion tool 150 may store copies of some or all virtual machine images that it handles, whether temporarily while the processing is performed or more permanently (e.g., until the user indicates that processing of the virtual machine image is done). Such stored copies may correspond to the virtual machine image data before, during and/or after its manipulation, and may be stored local to the image conversion tool or on one or more remote storage devices.

After the extracted data for a particular virtual machine image is prepared for the destination execution environment, an interface 160 specific to the destination environment is used to perform one or more interactions 114 with the destination execution environment to provide the modified data of the virtual machine image to the destination execution environment, to enable the virtual machine image to be executed by the destination execution environment based on the modified data. In the illustrated embodiment, the interactions 114 occur over one or more networks 100, although in other embodiments, the image conversion tool 150 may execute locally to a particular destination execution environment (e.g., within that destination execution environment, or otherwise as part of the capabilities provided by that destination execution environment). The interactions 114 may in this example involve interacting with a manager module 195 at the destination execution environment, such as to interact with one or more APIs provided by the manager module.

After the modified data for the virtual machine image is provided to the destination execution environment, the data may be stored as part of a virtual machine image 185 in the destination execution environment, such as to correspond to one or more hard disks 190 that represent the virtual machine image. While not illustrated in this example, in other embodiments the interactions 114 may include providing the modified data for the virtual machine image in other manners, such as to instead store the modified data in a separate storage service that is distinct from but accessible to the destination execution environment, to provide a copy of the modified data to the user 175 (e.g., on a transportable computer-readable storage medium), etc. In addition, in this example, the image conversion tool 150 interacts 114 directly with the destination execution environment 180, although in other embodiments the image conversion tool may instead first interact with one or more optional modules 140, such as if functionality of the image conversion tool is in some embodiments separated into multiple modules, such as one module local to the source virtualization environment and another module local to the destination execution environment. If so, the module 140 may perform some or all of the interactions with the destination execution environment 180 that occur in a manner specific to that destination execution environment.

As previously noted, the image conversion tool 150 may, in at least some embodiments and situations, be configured to support interactions with multiple different types of source virtualization environments. Thus, in the illustrated example, the user 175 (or a different user, not shown) may perform additional interactions with the image conversion tool in order to similarly access and extract data for one or more virtual machine images or other software images from a distinct virtualization environment of a distinct type from that of the source virtualization environment A 120*a*, such as to interact with a distinct virtualization environment N 120*n*. To do so, the image conversion tool 150 in the illustrated embodiment uses a distinct interface module 170*n* that is configured to perform interactions in a manner specific to the source virtualization environment N 120*n*, by performing one or more interactions 118. In addition, in this example the source virtualization environment N 120*n* is remote from the image conversion tool 150, and thus the interactions 118 occur over one or more networks 100. It will be appreciated that other configurations of systems and corresponding interactions may be provided in other embodiments.

Figure 2:
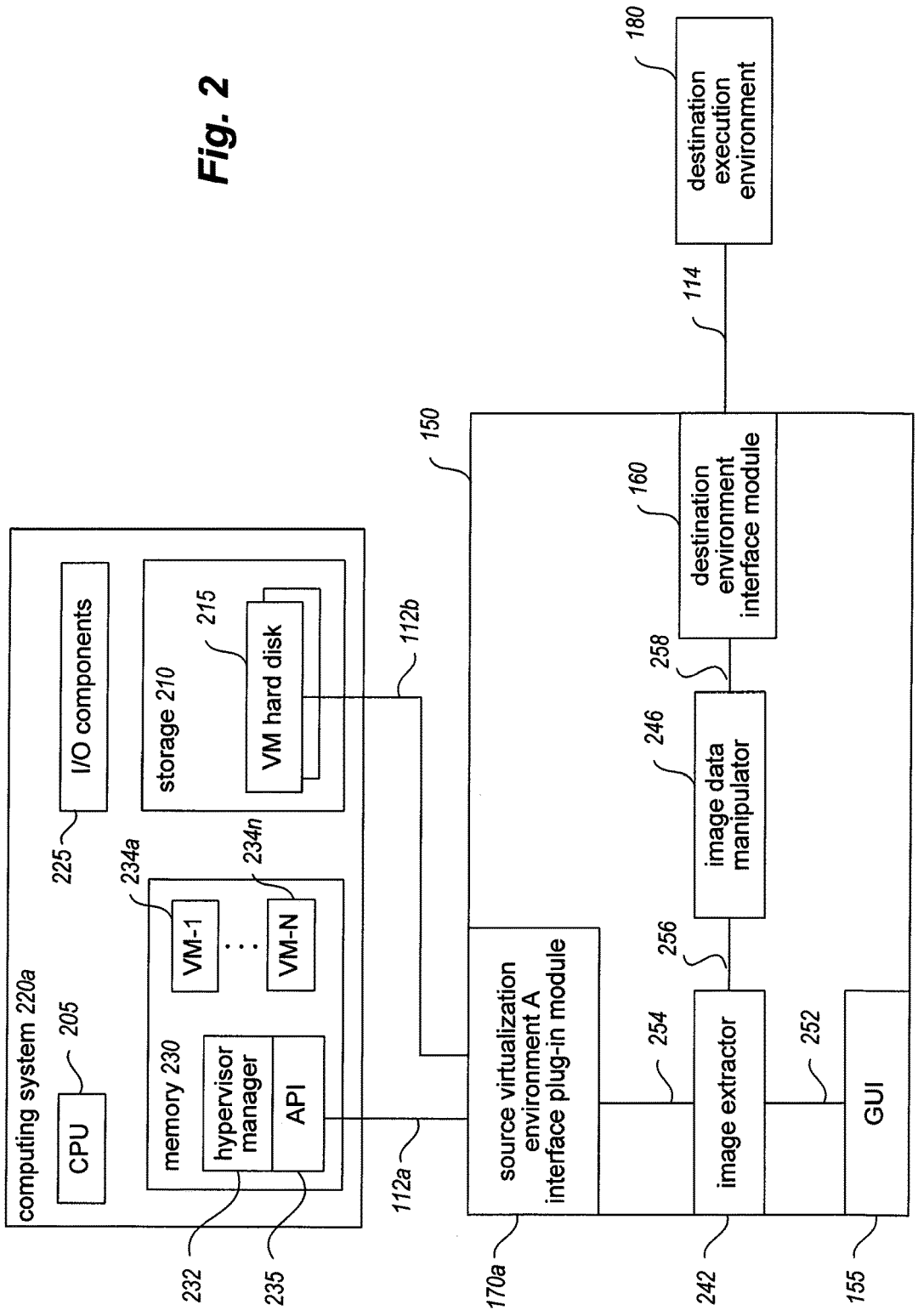
FIG. 2 illustrates an example of use of an image conversion tool.

FIG. 2 illustrates additional details regarding examples of interactions that may be performed between an image conversion tool and a source virtualization environment. In the example of FIG. 2, the image conversion tool 150 of FIG. 1 is illustrated with additional details corresponding to internal modules of the tool and related data interactions that may occur.

In particular, in the example of FIG. 2, after a user (not shown) interacts with a GUI provided by a module 155, the GUI module perform one or more interactions 252 with an image extractor module 242 of the image conversion tool 150. In this example, the image extractor module 242 may, for example, control interactions with various source virtualization environments in a manner that is partially or wholly independent of the particular interaction techniques used by particular source virtualization environments. The image extractor module 242 may further perform additional operations, such as to provide information received from a source virtualization environment to the GUI to enable further user interactions, and to initiate additional actions involving extracted data that is received from a source virtualization environment, as discussed further below. In other embodiments, directions may be provided to the image extractor module 242 in other manners, such as may be initiated by a user via programmatic interactions with the tool 150 that do not use the GUI, or via an automated determination by the tool 150 that is not initiated by a user.

In this example, the user has indicated to interact with the source virtualization environment A 120a of FIG. 1, and accordingly the interface plug-in module 170a of the image conversion tool is used by the image extractor module 242. Thus, the image extractor module performs one or more interactions 254 with the interface plug-in module 170a to initiate interactions with the source virtualization environment A, in order to obtain corresponding information and to extract one or more virtual machine images as designated. For example, the image extractor module 242 may specify types of interactions to perform with the source virtualization environment A (e.g., to obtain data about available virtual machine images or other software images, to extract data for an indicated virtual machine image or other software image, etc.), and the module 170a may implement those interaction types in a manner specific to the source virtualization environment A.

In the illustrated embodiment, the source virtualization environment A 120a of FIG. 1 includes or is supported by one or more computing systems 220, with an illustrated example computing system 220a illustrated in FIG. 2. In this example, the computing system 220a may include one or more CPU processors 205, various types of I/O components 225, memory 230, and storage 210, with additional details related to such hardware components discussed with respect to FIG. 3. In this example, the computing system 220a provides multiple virtual machines 234 that are part of the memory 230, such as with each virtual machine having a dedicated portion of memory for use in executing a virtual machine image. In addition, the memory 230 in this example executes a hypervisor monitor manager module 232 that controls operations of the virtual machines 234.

In this example, the manager module 232 provides an API 235 specific to the source virtualization environment A that enables programmatic interactions with the manager module 232 by other executing programs, although in other embodiments such an API may be provided for a source virtualization environment in other manners. Accordingly, the interface plug-in module 170a of the image conversion tool may perform one or more interactions 112a with the API 235 of the manager module 232 in order to obtain information about one or more of the virtual machine images being executed in one or more of the virtual machines 234, or otherwise to obtain information about virtual machine images of the source virtualization environment (e.g., that are registered or stored but not currently executing). In addition, the interactions 112a may include supplying user-specific information to the source virtualization environment A, such as after that information is received from the user of the image conversion tool, to enable the source virtualization environment A to authenticate the user and/or access information specific to the user. In some embodiments, the manager module 232 may obtain and provide data corresponding to one or more such virtual machine images, such as data corresponding to a current state in memory of an executing virtual machine image.

In addition, as previously noted, at least some such virtual machine images that are executable by the source virtualization environment A may each include one or more hard disks that store data corresponding to the virtual machine image, including to store such hard disk data on nonvolatile storage while the virtual machine image is not executing. In this example, the storage 210 of the computing system 220a may include one or more such virtual machine hard disks 215, although in other embodiments the hard disks may be stored remotely from the computing system 220a on which the virtual machines execute. Accordingly, in at least some embodiments and situations, the interface plug-in module 170a may be able to perform interactions 112b directly with the computing system 220a to obtain access to one or much such hard disks 215 from storage 210, such as to download or otherwise obtain copies of one or more such hard disks 215. Such interactions 112b may be performed instead of or in addition to interactions 112a, such as based on the types of interfaces available from a particular source virtualization environment and the types of interactions to be performed.

After the data corresponding to a particular source virtual machine image is obtained in this example by the interface plug-in module 170a from the computing system 220a, the data is received by the image extractor module 242 from the interface plug-in module. The image extractor module then provides the data via one or more interactions 256 to an internal image data manipulator module 246 of the image conversion tool 150. The image data manipulator module performs one or more modifications to the obtained data in order to prepare the data for execution in the destination execution environment, as described in greater detail elsewhere, including to use data (not shown) specific to the destination execution environment that is stored by or accessible to the image conversion tool, such as to optionally add such data to the modified obtained data. The operations of the image data manipulator module may in some embodiments be directed at least in part based on configuration information specific to the destination execution environment, such as to support an ability of the image conversion tool to modify data for multiple distinct destination execution environments in some such embodiments, optionally by having distinct output interface modules specific to each such destination execution environment. In addition, the operations of the image data manipulator module 246 may be directed at least in part by the user in some embodiments and situations, such as to control particular manipulations that are performed, based on interactions of the user with the GUI and as provided to the image data manipulator module 246, whether directly (not shown) or via the image extractor module 242.

In the illustrated embodiment, after the image data manipulator module modifies the obtained data for the virtual machine image to correspond to the destination execution environment 180, the module 246 performs one or more interactions 258 with the destination environment interface module 160 of the image conversion tool 150, which in this example initiates one or more interactions 114 with the destination execution environment 180 to provide the modified data to the destination execution environment for execution as part of the virtual machine image in the destination environment, as described with respect to FIG. 1. The operations of the modules 246 and/or 160 may further, in some embodiments, be directed based at least in part on other interactions by the user with the GUI 155, such as to enable the user to specify configuration information for parameters related to execution of the virtual machine image in the destination execution environment. Such configuration information may include details related to how and when the destination execution environment will execute the virtual machine image, including based on types of computing resources to be used to perform the execution, an account of the user with the destination execution environment, etc.

In at least some embodiments, the image conversion tool 150 may further perform activities to assist the user in identifying virtual machine images or other software images of source virtualization environments that are not eligible or available to be modified and executed in a particular destination execution environment. For example, the image conversion tool 150 may identify information within a particular software image that is not compatible with a particular destination execution environment, such as by inspecting portions of the software image or its metadata, and provide corresponding warnings or functionality to the user. Such information for a software image may include, for example, a particular operating system or other particular software program that is included or not included in the software image, particular types of data formats, particular software image sizes or data configurations, etc.

Figure 3:
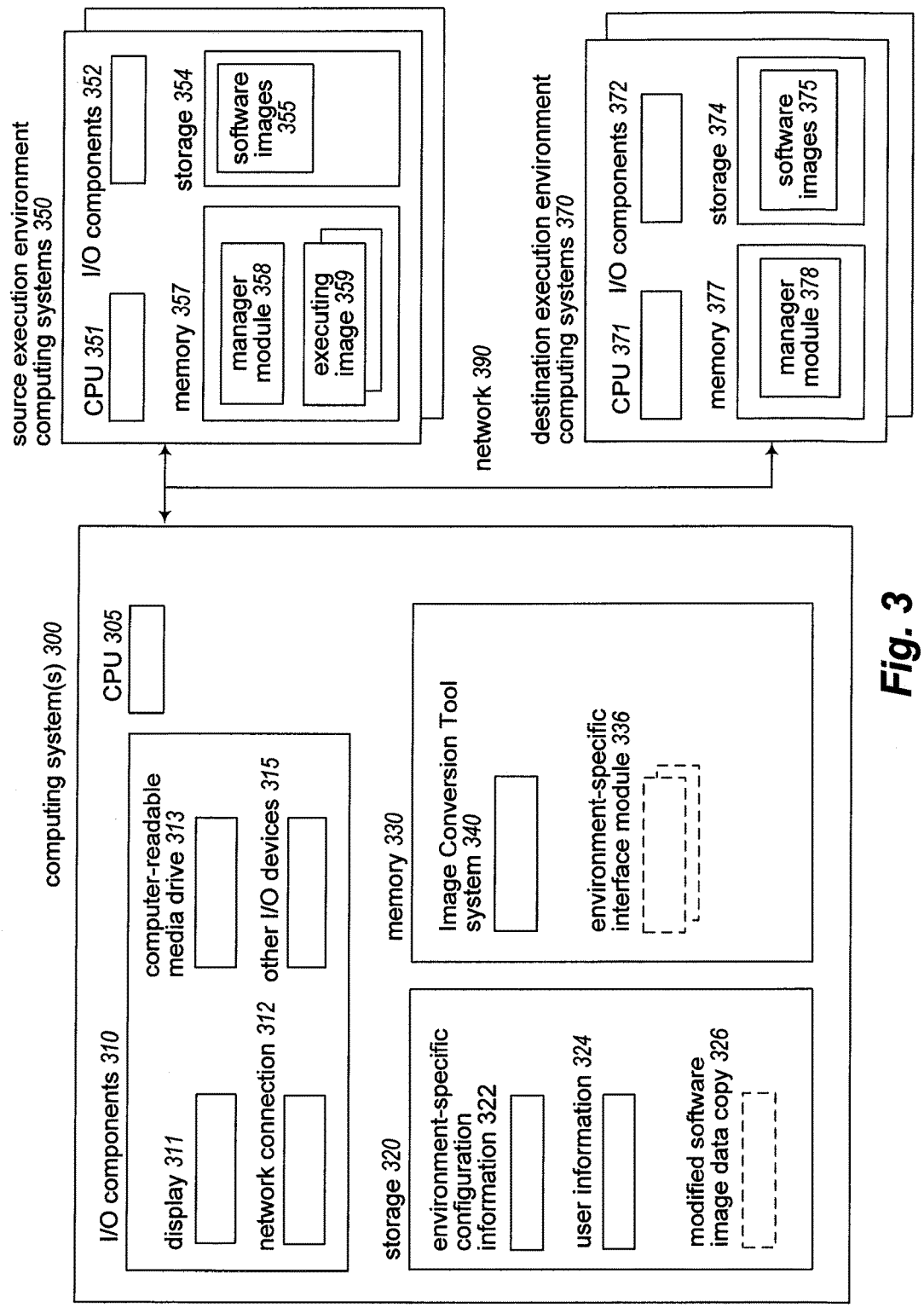
FIG. 3 is a block diagram illustrating an example computing system suitable for executing an embodiment of an image conversion tool.

FIG. 3 is a block diagram illustrating one or more computing systems suitable for executing an embodiment of an image conversion tool system that facilitates sharing and reuse of executable software images between multiple execution environments. In particular, FIG. 3 illustrates one or more computing systems 300 suitable for executing an embodiment of a image conversion tool system 340, as well as multiple computing systems 350 that are part of multiple source execution environments, and one or more computing systems 370 that are part of one or more destination execution environments. Some or all of the execution environments may, for example, be virtualization environments in which virtual machine images execute.

In the illustrated embodiment, the computing system(s) 300 each includes one or more CPU processors 305, various I/O components 310, storage 320, and memory 330, with the I/O components including a display 311, a network connection 312, a computer-readable media drive 313, and other I/O devices 315 (e.g., a keyboard, mouse, speakers, etc.)—in other embodiments, each computing 300 may include additional hardware components and/or lack some of the illustrated hardware components. The computing systems 350 are each similarly illustrated as including one or more CPU processors 351, various I/O components 352, storage 354, and memory 357, and the computing systems 370 are each similarly illustrated as including one or more CPU processors 371, various I/O components 372, storage 374, and memory 377, although particular I/O components are not illustrated in this example.

In the illustrated embodiment, the image conversion tool system 340 executes in memory 330 of a computing system 300, such as to include software instructions that, when executed by one or more CPU processors 305, program or otherwise configure the computing system 300 to perform automated operations to provide some or all of the described techniques. In addition, in the illustrated embodiment, one or more optional environment-specific interface modules 336 may also execute in memory 330, such as to perform operations similar to those of interface modules 170 of FIG. 1, but in the illustrated embodiment may execute separately from the image conversion tool rather than being loaded within the image conversion tool. In other embodiments, such modules 336 may instead be implemented as part of the system 340, or alternatively may execute on another computing system (not shown) and interact with the image conversion tool system 340 over one or more networks 390.

The image conversion tool system 340 interacts with one or more users (not shown) of the computing system 300 to provide information about software image conversion activities and to receive corresponding instructions. In particular, the system 340 may interact with one or more multiple supported source execution environments that are provided by the computing systems 350 in order to obtain data corresponding to one or more source software images, such as by interacting with one or more manager modules 358 executing in memory 357 of each source execution environment to obtain data corresponding to software images 355, and/or by directly interacting with software images 359. While the various source execution environments are illustrated in this example as being separated from the system 340 by one or more networks 390, in other embodiments the system 340 may execute locally to at least one of the source execution environments. After data is obtained for a source image, the system 340 may further modify that data in a manner specific to a particular destination execution environment, and interact with one or more computing systems 370 of that destination execution environment (e.g., with one or more manager modules 378 executing in memory 377) to create a new corresponding software image 375 that is executable within the destination execution environment. As part of the operation of the system 340, it may store and use various environment-specific configuration information 322 (e.g., as part of one or more plug-in interface modules for the system 340) and user information 324, and may also optionally store copies 326 of modified data for software images. Additional details related to operation of embodiments of an image conversion tool are described elsewhere herein.

It will be appreciated that computing systems 300, 350 and 370 are merely illustrative and are not intended to limit the scope of embodiments of the present disclosure. The image conversion tool system 340 may instead be executed by multiple interacting computing systems or devices, and computing system(s) 300 may be connected to other devices that are not illustrated, including through one or more networks such as the Internet, via the World Wide Web ("Web"), or other electronic communications network (e.g., cellular based network, public switched telephone network). More generally, a "client" or "server" computing system may comprise any combination of hardware and/or firmware that may interact in the described manners, optionally when programmed or otherwise configured with particular software, including (without limitation) desktop or other computers (e.g., laptops, tablets, smart phones, etc.), cell phones, network devices, PDAs, wireless phones, pagers, electronic organizers, Internet appliances, network-attached storage, devices in a storage area network, television-based systems (e.g., using set-top boxes and/or personal/digital video recorders), game consoles, media players and various other consumer products that include appropriate inter-communication capabilities. In addition, the functionality provided by the image conversion tool system 340 may in some embodiments be integrated as part of one or more other programs and systems, and/or may be separated into multiple modules, as described in greater detail elsewhere.

It will also be appreciated that, while various items are discussed or illustrated as being stored in volatile memory or on non-volatile storage while being used, these items or portions of them can be transferred between memory and other storage devices for purposes of memory management and data integrity. Alternatively, in other embodiments some or all of the software systems and/or modules may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., the image conversion tool) and/or data structures, such as by execution of software instructions of the one or more software programs and/or by storage of such software instructions and/or data structures. Furthermore, in some embodiments, some or all of the described techniques of the indicated systems and/or modules may be implemented or provided in other manners, such as at least partially using firmware and/or hardware means, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, modules and/or data structures may also be stored (e.g., as software instructions or structured data) on one or more non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
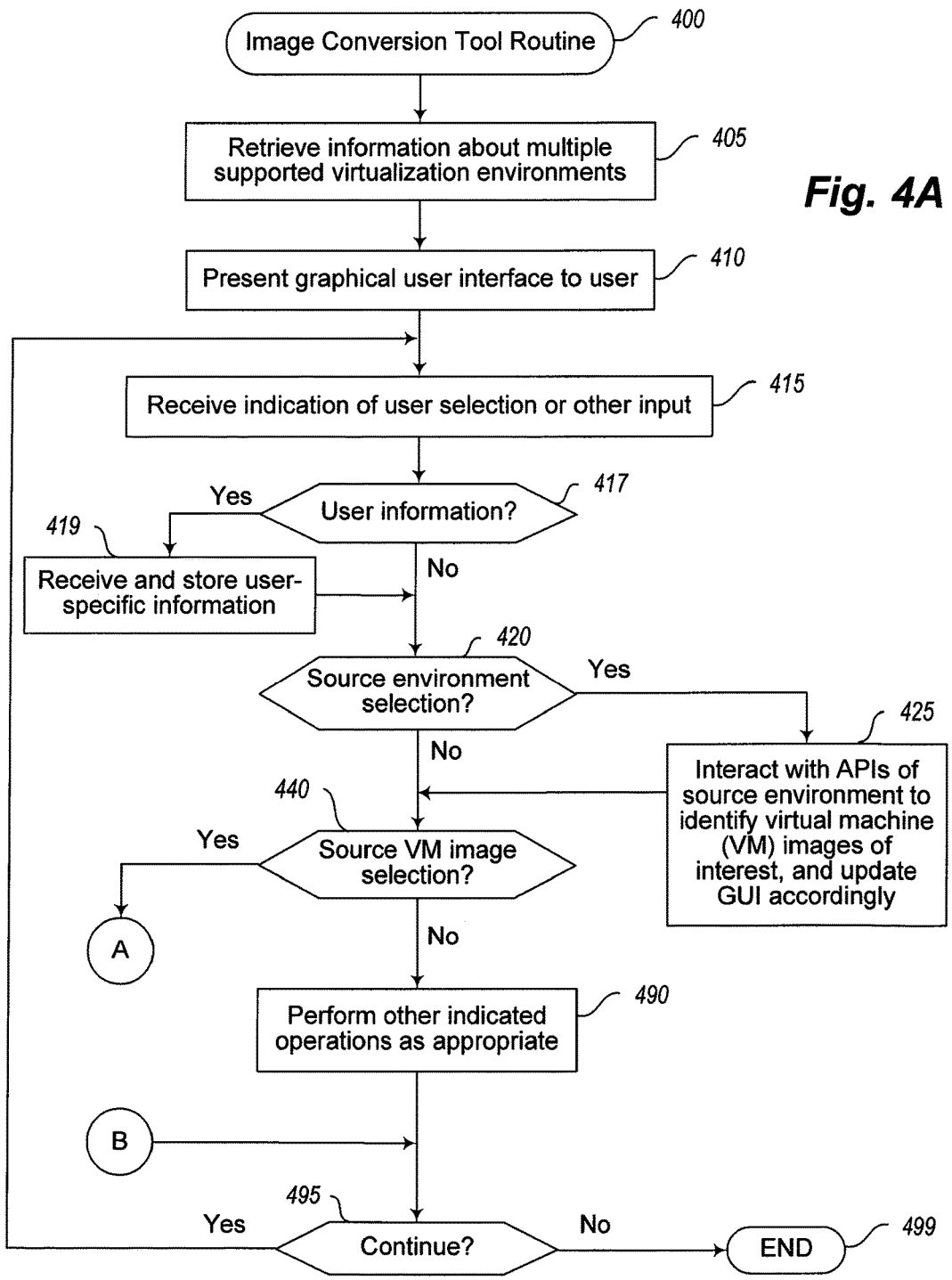
FIGS. 4A and 4B are a flow diagram of an example embodiment of an Image Conversion Tool routine.
Figure 4B:
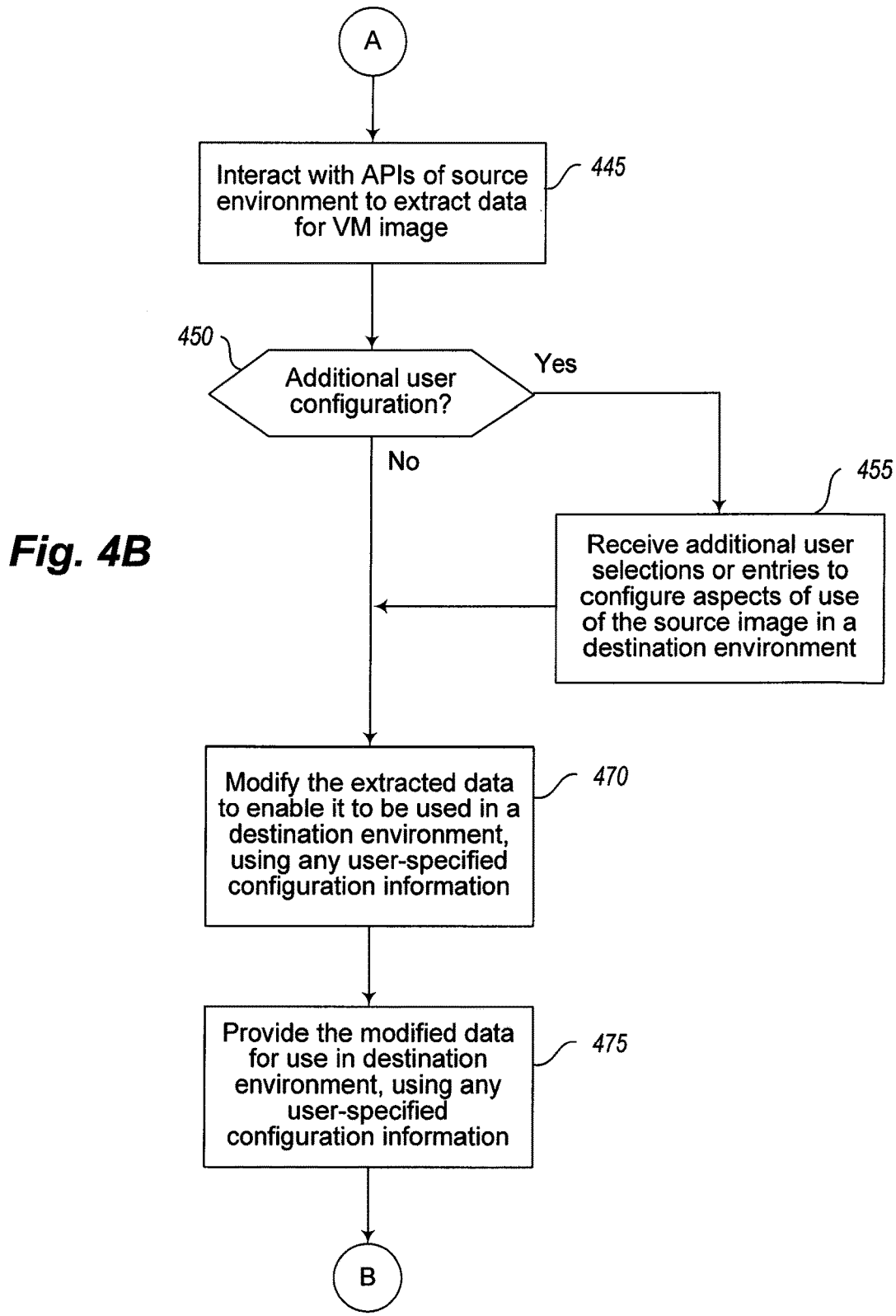

FIGS. 4A and 4B are a flow diagram of an example embodiment of an Image Conversion Tool routine 400. The routine may be provided by, for example, execution of the image conversion tool 150 of FIGS. 1 and 2 and/or the image conversion tool system 340 of FIG. 3, such as to assist users in converting software images from one of multiple source software execution environments for execution in at least one distinct destination execution environment. In the illustrated embodiment, the routine 400 is performed with respect to virtual machine images and corresponding virtualization execution environments, although in other embodiments other types of software images and/or execution environments may be handled. In addition, in the illustrated embodiment, the routine 400 may execute on one or more computing systems that are not part of any source execution environments or destination execution environments, although in other embodiments some or all of the functionality of the routine 400 may instead be integrated with or otherwise affiliated with one or more such execution environments (e.g., with a particular destination execution environment).

The routine 400 begins at block 405 of FIG. 4A, where information is retrieved about multiple supported virtualization environments. For example, upon initialization of the image conversion tool, the tool may retrieve configuration information regarding multiple supported source virtualization environments and optionally one or more supported destination virtualization environments. As discussed in greater detail elsewhere, in some embodiments some or all of the configuration information for a specific virtualization environment may be included as part of a plug-in or other interface module that may be loaded by the image conversion tool, although in other embodiments the configuration information for a specific virtualization environment may be obtained by the image conversion tool in other manners. In the illustrated embodiment, after block 405, the routine continues to block 410 to present a graphical user interface to one or more users of the image conversion tool, such as to enable a user of the image conversion tool to specify image conversion activities to be performed. In blocks 415-490, the routine then proceeds to perform particular conversion activities for virtual machine images as directed by the user.

In particular, after block 410, the routine continues to block 415 and waits until an indication of user input or other data is received. The routine then continues to block 417 to determine if the input received is information specific to a current user. If so, the routine continues to block 419 to receive and store the user-specific information. As discussed in greater detail elsewhere, the user-specific information may be of various types, such as login or other access information for the user with respect to a specific source virtualization environment and/or a specific destination virtualization environment, user preferences with respect to configuration options, particular user selections or other designations of configuration parameters or other data to use, etc.

After block 419, or if it is instead determined in block 417 that the received user input was not user-specific information, the routine continues to block 420 to determine if the received input is a selection by the user of a particular source virtualization environment, such as from information presented to the user via the graphical user interface of one or more such available source virtualization environments, or instead as otherwise specified (e.g., by the user manually typing in or otherwise designating a particular source virtualization environment). If so, the routine continues to block 425 to interact with one or more APIs of the selected source virtualization environment to obtain information about one or more virtual machine images that are available in that source environment, and to update the GUI accordingly. The interactions with the source environment may, for example, be based in part on a particular user, such as based on use of user-specific information supplied with respect to block 419. In addition, the interactions with the source environment may be based in part or in whole on use of an interface module specific to the source virtualization environment (e.g., to use APIs of the source environment that are specific to that source environment), or to otherwise use configuration information specific to the source virtualization environment. In other embodiments (e.g., embodiments in which the source virtualization environment does not provide appropriate APIs), the routine may instead access data corresponding to one or more virtual machine images in other manners, such as to download hard disk files from the source virtualization environment.

After block 425, or if it is instead determined in block 420 that a selection of a source virtualization environment is not made, the routine continues instead to block 440 to determine if a user selection is made of a particular source virtual machine image available in a particular source virtualization environment, such as for a source virtualization environment previously selected in block 425, or as otherwise indicated—if so, the routine continues to block 445. The particular source virtual machine image may be indicated by the user in various manners, such as via a selection from information presented to the user via the graphical user interface of one or more such available virtual machine images, or instead as otherwise specified (e.g., by the user manually typing in or otherwise designating a particular virtual machine image). In other embodiments and situations, a particular user may supply a particular source virtual machine image to the routine 400, such as with information about a type of source virtualization environment with which the source virtual machine image, and if so block 425 may not be performed in such situations.

The routine in block 445 interacts with one or more APIs of the selected or otherwise indicated source virtualization environment to extract and receive data corresponding to the selected source virtual machine image, such as a copy of that virtual machine image or of one or more hard disks represented within that virtual machine image. In a manner similar to that previously indicated with respect to block 425, the interactions with the source virtualization environment may be performed based in part or in whole via use of a module specific to that source virtualization environment, such as to enable interactions with the source environment specific to that source environment (e.g., to use APIs of the source environment that are specific to that source environment). In other embodiments (e.g., embodiments in which the source virtualization environment does not provide appropriate APIs), the routine may instead access data corresponding to one or more virtual machine images in other manners, such as to download hard disk files from the source virtualization environment. In addition, in embodiments in which a source virtual machine image copy is supplied to the routine by the user, the interactions with the source environment in block 445 may not be performed, or instead the interactions may be performed only to retrieve additional data (if any) corresponding to the source virtual machine image.

After block 445, the routine continues to block 450 to determine if the user has additional configuration information to specify with respect to modifying the source virtual machine image to execute in a particular destination virtualization environment, such as a selection of the destination virtualization environment from multiple available destination environment options, selections of capabilities available from a particular destination virtualization environment to be used by the virtual machine image when executing, etc. If so, the routine continues to block 455 to receive one or more additional user selections or entries that specify configuration information for aspects of use of the source virtual machine image in a destination environment. In some situations, additional user configuration information may not be specified in block 455, such as if the user determines to use default configuration capabilities of the image conversion tool, if the user previously specified configuration information to be used, if the user will later specify some configuration information that is not immediately needed with respect to the modification activities of block 470 or the later execution of the virtual machine image in the destination environment, etc.

After block 445, or if it was instead determined in block 450 that no additional user configuration information was received, the routine continues to block 470. In block 470, the routine performs one or more modifications to the extracted data or the source virtual machine to enable the modified data to be used to execute the virtual machine as part of a particular destination virtualization environment, with the modifications being performed using any user-specified configuration information, as described in greater detail elsewhere.

After block 470, the routine continues to block 475 to provide the modified data copy for use in the destination virtualization environment, including to use any user-specified configuration information related to activities to be performed as part of providing the modified data copy. In some embodiments, the routine in block 475 will transmit or otherwise send the modified data copy to the destination virtualization environment, such as if the image conversion tool is executing on one or more computing systems that are remote from (e.g., separated over one or more computer networks) the destination virtualization environment. In addition, while blocks 470 and 475 are illustrated as being performed with respect to only a single destination virtualization environment in the illustrated embodiment of the routine, in other embodiments the extracted source virtual machine data may be modified for and used with multiple distinct destination virtualization environments, whether immediately or at later times. In other embodiments, the providing of the modified data may include providing a copy of the modified data to the user (e.g., by storing it in a user-specified location), such as to enable the user to later supply the modified data to the destination virtualization environment.

If it is instead determined in block 440 that the received input is not a selection or other indication of a particular source virtual machine image, the routine continues instead to block 490 to perform one or more other indicated operations as appropriate. Other types of indicated operations may include, for example, one or more of the following: receiving a request from a user for status information and responding accordingly, such as to enable a user to monitor current status of performing a virtual machine conversion and/or to retrieve information about historical conversions that were previously performed; receiving one or more types of data from a particular virtualization environment, and storing the data or updating the GUI accordingly (e.g., if a response is received from a virtualization environment to an asynchronous request previously sent by the image conversion tool); etc.

After blocks 475 or 490, the routine continues to block 495 to determine whether to continue, such as until an explicit indication to terminate is received. If it is determined to continue, the routine returns to block 415 to wait for other input, and otherwise continues to block 499 and ends.

Figure 5:
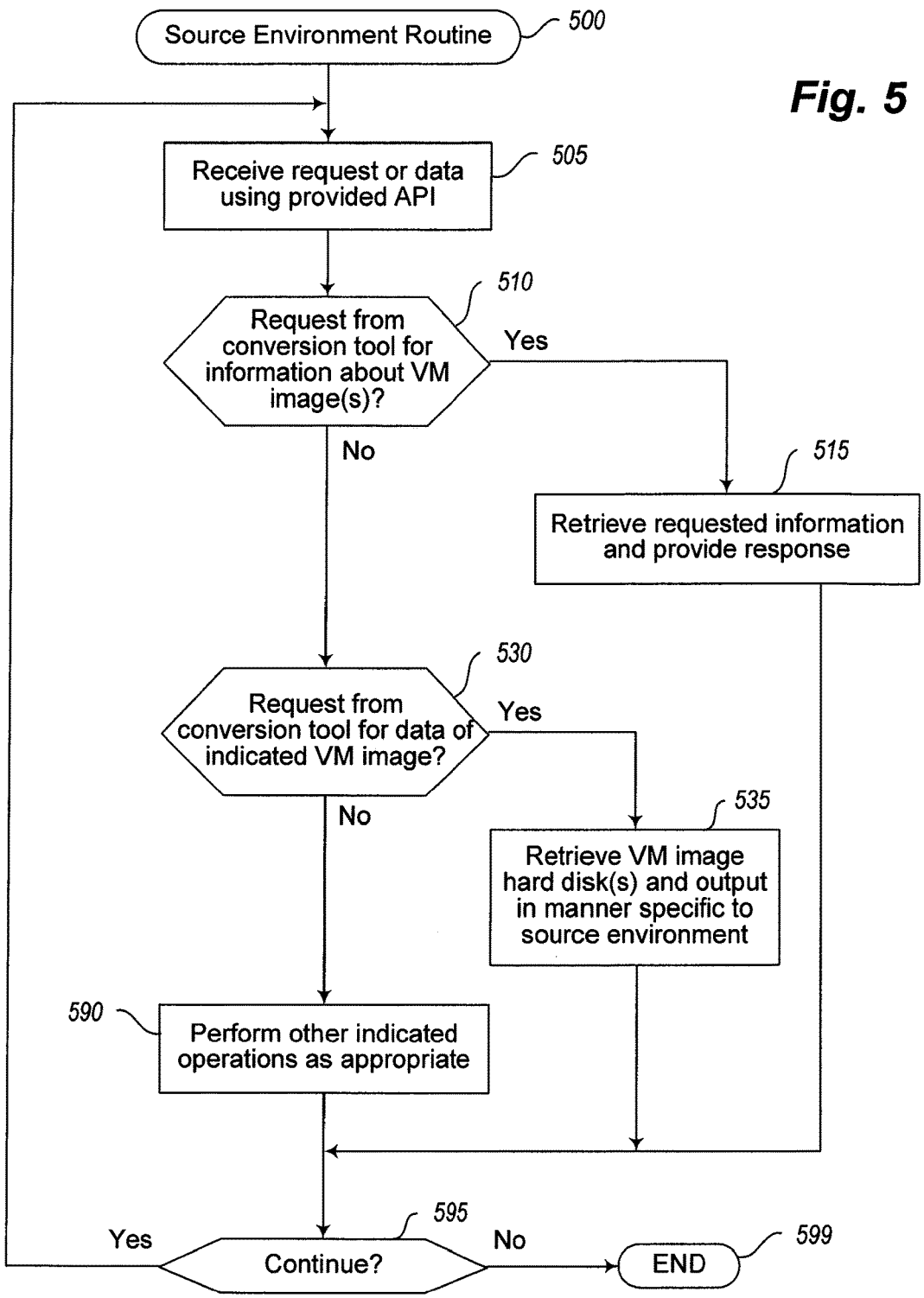
FIG. 5 is a flow diagram of an example embodiment of a routine that provides functionality of a source virtualization environment.

FIG. 5 is a flow diagram of an example embodiment of a routine 500 that may be performed by a particular source virtualization environment to support or otherwise correspond to interactions performed by the image conversion tool. The routine may be provided by, for example, execution of the manager module 135 of virtualization environment A 120a of FIG. 1, one or more modules (not illustrated) of virtualization environment N 120n of FIG. 1, manager module 232 of FIG. 2, and/or a manager module 358 of FIG. 3, such as to provide one or more APIs and respond to corresponding requests received via those APIs. In at least some embodiments, each source virtualization environment may simultaneously perform one or more copies of the routine 500 or a similar routine, and/or different source virtualization environments may simultaneously execute distinct copies of the routine 500 or a similar routine to support their own operations (optionally in a manner specific to that source virtualization environment). As noted with respect to routine 400 of FIGS. 4A and 4B, the illustrated embodiment of the routine 500 is performed with respect to virtual machine images, but in other embodiments other types of software images may be supported.

The routine 500 begins at block 505, where a request or data is received using one or more provided APIs. The routine continues to block 510 to determine if a request is received from an embodiment of the image conversion tool for information about one or more virtual machine images that are available in the source virtualization environment. If so, the routine continues to block 515 to retrieve and provide corresponding information for the request. If it is instead determined in block 510 that a request is not received for information about virtual machine images, the routine continues to block 530 to determine whether a request is received from an embodiment of the image conversion tool to provide data for an indicated virtual machine image. If so, the routine continues to block 535 to retrieve one or more hard disks for the indicated virtual machine image and to output the hard disk data in a manner specific to the source environment APIs, or to otherwise retrieve and supply data corresponding to the indicated virtual machine image. If it is instead determined in block 530 that a request is not received for data corresponding to a particular indicated virtual machine image, the routine continues instead to block 590 to perform one or more other indicated operations as appropriate, such as to receive and respond to other types of requests from the image conversion tool, to receive and respond to other types of requests from programs of users of the source virtualization environment, to receive and respond to a user request via the image conversion tool for information about an account of the user with the destination virtualization environment; etc.

After blocks 515, 535, or 590, the routine continues to block 595 to determine whether to continue, such as until an explicit indication to terminate is received. If it is determined to continue, the routine returns to block 505, and otherwise continues to block 599 and ends.

Figure 6:
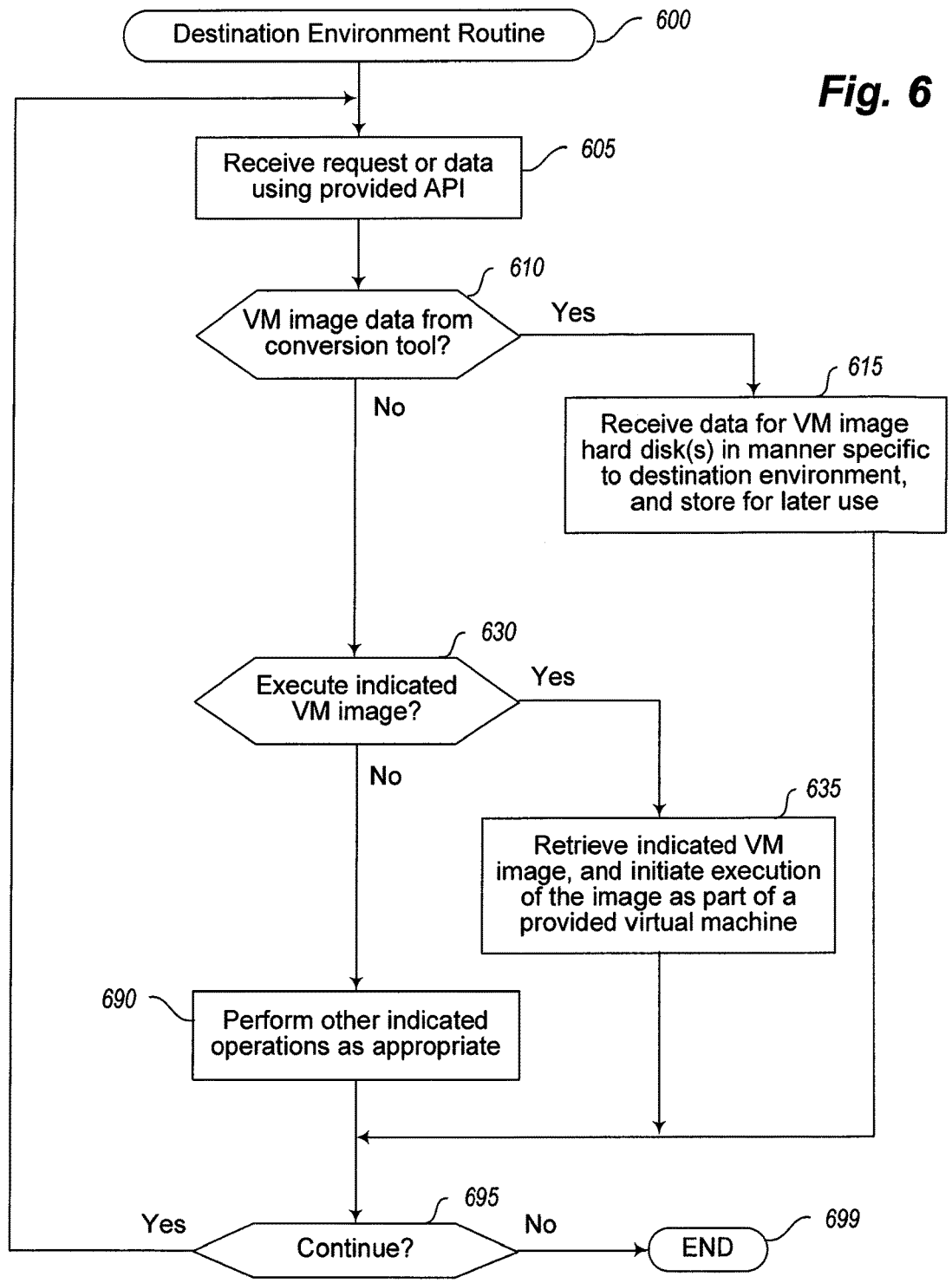
FIG. 6 is a flow diagram of an example embodiment of a routine that provides functionality of a destination virtualization environment.

FIG. 6 is a flow diagram of an example embodiment of a routine 600 that may be performed by a particular destination virtualization environment to support or otherwise correspond to interactions performed by the image conversion tool. The routine may be provided by, for example, execution of the manager module 195 of FIG. 1, one or more modules (not shown) of the destination execution environment 180 of FIG. 2, and/or the manager module 378 of FIG. 3, such as to provide one or more APIs and respond to corresponding requests received via those APIs. In at least some embodiments, each destination virtualization environment may simultaneously perform one or more copies of the routine 600 or a similar routine, and/or different destination virtualization environments may simultaneously execute distinct copies of the routine 600 or a similar routine to support their own operations (optionally in a manner specific to that destination virtualization environment). As noted with respect to routine 400 of FIGS. 4A and 4B, the illustrated embodiment of the routine 600 is performed with respect to virtual machine images, but in other embodiments other types of software images may be supported.

The routine 600 begins at block 605, where a request or data is received using one or more provided APIs. The routine continues to block 610 to determine if a request is received from an embodiment of the image conversion tool related to data to be provided to the routine from the image conversion tool corresponding to a virtual machine image. If so, the routine continues to block 615 to receive data corresponding to one or more hard disks of a virtual machine image specified in a manner specific to the destination virtualization environment, and stores the data for later use. In some embodiments and situations, the received data may further include additional information, such as a user with whom the virtual machine image is associated, about parameter values to use during later execution of the virtual machine, as described in greater detail elsewhere. If it is instead determined in block 610 that the received request is not to provide data for a virtual machine image, the routine continues instead to block 630 to determine whether a request is received from an embodiment of the image conversion tool to execute an indicated virtual image, such as a virtual image previously provided by the image conversion tool and stored with respect to block 615. If so, the routine continues to block 635 to retrieve the data for the indicated virtual machine image and to initiate execution of the indicated virtual machine image as part of a virtual machine provided by the destination virtualization environment. The execution of the virtual machine image may be performed in accordance with any configuration information specified along with the request, or previously specified with respect to the indicated virtual machine image or with respect to a user on whose behalf the image is being executed. If it is instead determined in block 630 that the received request is not to execute an indicated virtual machine image, the routine continues instead to block 690 to perform one or more other indicated types of operations as appropriate. Such other operations may include, for example, responding to other types of requests from the image conversion tool and/or from other executing programs of users, such as to provide status information for a user regarding ongoing execution of an indicated virtual machine (e.g., to enable monitoring of the execution), to provide historical information for a user about previous execution of virtual machine images, to receive and respond to a user request for information about an account of the user with the destination virtualization environment; etc.

After blocks 615, 635, or 690, the routine continues to block 695 to determine whether to continue, such as until an explicit indication to terminate is received. If it is determined to continue, the routine returns to block 605, and otherwise continues to block 699 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, it will be appreciated that in other embodiments the operations may be performed in other orders and in other manners. It will also be appreciated that the data structures discussed above may be structured in different manners, including with respect to database data structures and Web page data structures, such as by having a single data structure split into multiple data structures or by having multiple data structures consolidated into a single data structure. Similarly, in some embodiments, illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In addition, while certain aspects are presented below in certain claim forms, the inventors contemplate the various aspects in any available claim form. For example, while only some aspects of the disclosure may currently be recited as being embodied in a computer-readable medium, other aspects may likewise be so embodied.

What is claimed is:

1. A system comprising:
one or more hardware processors of one or more computing systems; and
one or more memories with stored instructions that, when executed by at least one of the one or more hardware processors, cause the system to perform operations for a computer virtualization environment that executes virtual machine images for multiple users and that supports multiple application programming interfaces (APIs) for use in interacting with multiple additional source virtualization environments to import virtual machine images into the computer virtualization environment, including at least:
receiving instructions from a user of the multiple users to import a virtual machine image into the computer virtualization environment from a separate second virtualization environment that is one of the multiple additional source virtualization environments;
determining one of the multiple APIs to use in interacting with the second virtualization environment;
interacting, over one or more computer networks and using the determined one API, with the second virtualization environment to obtain a copy of the virtual machine image that is executable by the second virtualization environment, including receiving, from at least one computing system that performs operations for the second virtualization environment, at least one file that is in a format specific to the second virtualization environment and that includes at least some of the virtual machine image;
modifying the obtained copy of the virtual machine image to be executable in the computer virtualization environment, including modifying contents of the obtained copy; and
initiating execution of the modified copy of the virtual machine image in the computer virtualization environment.

2. The system of claim 1 wherein the receiving of the at least one file includes retrieving one or more data files that are stored by the second virtualization environment and are used by the second virtualization environment as part of the virtual machine image.

3. The system of claim 1 wherein the receiving of the at least one file occurs while the virtual machine image is being executed by the second virtualization environment.

4. The system of claim 1 wherein the stored instructions are part of a conversion tool that is executed at least in part in the computer virtualization environment and further cause the system to provide a graphical user interface to the user that includes information about multiple remote virtualization environments supported by the conversion tool, and wherein the receiving of the instructions from the user is performed via interactions of the user with the provided graphical user interface.

5. The system of claim 1 wherein the stored instructions are part of a conversion tool that is executed at least in part in the computer virtualization environment and further cause the system to provide a graphical user interface to the user that includes information about multiple remote virtual machine images executable by one or more other virtualization environments, and wherein the receiving of the instructions from the user is performed via interactions of the user with the provided graphical user interface.

6. The system of claim 1 wherein the initiating of the execution of the modified copy of the virtual machine image in the computer virtualization environment includes provisioning one of multiple virtual machines provided by the computer virtualization environment on the one or more computing systems, and executing the modified copy of the virtual machine image in the provisioned one virtual machine.

7. The system of claim 1 wherein the computer virtualization environment and the second virtualization environment are different types of virtualization environments provided by different companies, and wherein the stored instructions further cause the system to store the modified copy of the virtual machine image in the computer virtualization environment for later execution by the user.

8. The system of claim 1 wherein the modified virtual machine image is a bootable image that includes operating system software and at least one application program, and wherein the one or more computing systems include a first computing system local to the computer virtualization environment that is configured to execute a first module of an image conversion tool and include a second computing system local to the second virtualization environment that is configured to execute a second module of the image conversion tool.

9. A computer-implemented method comprising:
receiving, by one or more computing systems supporting a computer virtualization environment that executes virtual machine images for multiple users and that supports multiple application programming interfaces (APIs) for use in interacting with multiple remote virtualization environments to import virtual machine images into the computer virtualization environment, instructions from a user of the multiple users to import a virtual machine image into the computer virtualization environment from a second virtualization environment that is one of the multiple remote virtualization environments;
retrieving, by the one or more computing systems, information indicating one of the multiple APIs supported by the second virtualization environment;
interacting, by the one or more computing systems over one or more computer networks and using at least the indicated one API, with a second computing system, that performs operations for the second virtualization environment, to obtain a copy of the virtual machine image that is executable by the second virtualization environment, including receiving from the second computing system at least one file that is in a format specific to the second virtualization environment and that includes at least some of the virtual machine image;
modifying, by the one or more computing systems, the obtained copy of the virtual machine image to be executable in the computer virtualization environment, including modifying contents of the obtained copy; and initiating, by the one or more computing systems, execution of the modified copy of the virtual machine image in the computer virtualization environment.

10. The computer-implemented method of claim 9 wherein the one or more computing systems execute, as part of the computer virtualization environment, an image conversion tool that performs the interacting and the modifying, and wherein the method further comprises:
   interacting, by the executing image conversion tool, with a third virtualization environment of the multiple remote virtualization environments to obtain a second virtual machine image for the user that is executable by the third virtualization environment, the interacting being performed using a second API that is distinct from the indicated one API used with the second virtualization environment;
   modifying, by the executing image conversion tool, the obtained second virtual machine image to be executable in the computer virtualization environment; and
   supplying, by the executing image conversion tool, the modified second virtual machine image for execution in the computer virtualization environment.

11. The computer-implemented method of claim 10 further comprising presenting, by the executing image conversion tool, a graphical user interface to the user, including indications of multiple virtual machine images in the second virtualization environment, wherein the received instructions are based on one or more selections performed by the user via the presented graphical user interface, and wherein the interacting with the second computing system to obtain the copy of the virtual machine image is performed in response to the received instructions from the user.

12. The computer-implemented method of claim 10 wherein the multiple remote virtualization environments are of a plurality of distinct types and are provided by a plurality of companies, the plurality of distinct types including multiple of VMWare Server, VMWare Workstation, XenServer, Hyper-V Server, VirtualBox, Kernel-based Virtual Machine, and OpenVZ.

13. The computer-implemented method of claim 9 further comprising:
   receiving, by the one or more computing systems, configuration information from the user related to execution of the virtual machine image in the computer virtualization environment;
   selecting, by the one or more computing systems, one or more computing nodes from a plurality of computing nodes provided by the computer virtualization environment, and configuring the selected computing nodes based on the configuration information; and
   performing, by the one or more computing systems, the execution of the modified copy of the virtual machine image in the computer virtualization environment on the configured selected computing nodes.

14. The computer-implemented method of claim 9 wherein the at least one file includes one or more data files that represent at least one hard disk of the virtual machine image and that are in the format specific to the second virtualization environment, and wherein the modifying of the obtained copy of the virtual machine image includes changing the format of the one or more data files to a second format that is specific to the computer virtualization environment and is distinct from the format specific to the second virtualization environment.

15. The computer-implemented method of claim 9 wherein the modifying of the obtained copy of the virtual machine image includes adding software to the obtained copy of the virtual machine image to enable the obtained copy of the virtual machine image to be executable in the computer virtualization environment, the added software including at least one of a group including one or more software libraries, one or more software drivers, or one or more software application programs.

16. A non-transitory computer-readable medium having stored contents that cause one or more computing systems to perform operations including:
   providing, by the one or more computing systems, a computer virtualization environment that is for use in executing virtual machine programs for multiple users and that includes a conversion tool for use on behalf of the multiple users, wherein the conversion tool supports multiple application programming interfaces (APIs) for use in interacting with multiple other virtualization environments to import virtual machine programs from the multiple other virtualization environments into the computer virtualization environment on behalf of the multiple users;
   receiving, under control of the conversion tool, instructions from one of the multiple users to import an indicated virtual machine program into the computer virtualization environment from a second virtualization environment that is one of the multiple other virtualization environments;
   interacting, under control of the conversion tool and using one of the multiple APIs that is selected for the second virtualization environment, with the second virtualization environment to obtain a copy of the indicated virtual machine program that is executable by the second virtualization environment, including receiving, from at least one computing system that performs operations for the second virtualization environment, at least one file that is in a format specific to the second virtualization environment and that includes at least some of the indicated virtual machine program;
   modifying, under control of the conversion tool, the obtained copy of the indicated virtual machine program to be executable in the computer virtualization environment, including modifying contents of the obtained copy; and
   initiating execution of the modified copy of the indicated virtual machine program in the computer virtualization environment.

17. The non-transitory computer-readable medium of claim 16 wherein the stored contents include software instructions that, when executed, further cause the one or more computing systems to:
   interact, under control of the conversion tool, and using a second API from the multiple APIs that is distinct from the one API used with the second virtualization environment and that is selected for a third virtualization environment of the multiple other virtualization environments, with the third virtualization environment to obtain for a second user a second virtual machine program that is executable by the third virtualization environment;
   modify, under control of the conversion tool, the obtained second virtual machine program to be executable in the computer virtualization environment; and
   supply, under control of the conversion tool, the modified second virtual machine program for execution in the computer virtualization environment.

18. The non-transitory computer-readable medium of claim 16 wherein the stored contents further cause the one or more computing systems to present, under control of the conversion tool, a graphical user interface to the one user, including indicating the multiple other virtual environments, wherein the received instructions are based on one or more selections performed by the one user via the presented graphical user interface that select the second virtualization environment from the indicated multiple other virtual environments and that select the indicated virtual machine program from multiple virtual machine programs in the second virtualization environment, and wherein the interacting with the second virtualization environment to obtain the copy of the indicated virtual machine program is performed in response to the received instructions from the one user.

19. The non-transitory computer-readable medium of claim 16 wherein the indicated virtual machine program is a virtual machine image that includes an operating system and one or more application programs and data for use by the one or more application programs, and wherein the stored contents further cause the one or more computing systems to:

receive, by the one or more computing systems, configuration information from the one user related to execution of the indicated virtual machine program in the computer virtualization environment;

select, by the one or more computing systems, one or more computing nodes for use by the one user from a plurality of computing nodes that are provided by the computer virtualization environment for use by the multiple users, and configure the selected computing nodes based on the configuration information; and perform, by the one or more computing systems, the execution of the modified copy of the indicated virtual machine program in the computer virtualization environment on the configured selected computing nodes.

* * * * *